United States Patent [19]
Cunningham

[11] Patent Number: 5,477,758
[45] Date of Patent: Dec. 26, 1995

[54] AUTOMOTIVE FLYWHEEL AND BELT TENSION TOOL KIT

[76] Inventor: Jerry L. Cunningham, Rte. 2 Box 1C, Texico, N.M. 88135

[21] Appl. No.: 312,852

[22] Filed: Sep. 19, 1994

[51] Int. Cl.⁶ .................................................... B25B 23/16
[52] U.S. Cl. .................. 81/177.85; 81/484; 81/177.2; 81/124.4
[58] Field of Search .................. 81/484, 119, 121.1, 81/124.4, 124.5, 124.7, 177.1, 177.2, 177.85, 180.1

[56] References Cited

U.S. PATENT DOCUMENTS

| | | | |
|---|---|---|---|
| 458,568 | 9/1891 | Fuchs | 81/124.4 X |
| 730,509 | 6/1903 | Baker | 81/177.85 X |
| 2,978,938 | 4/1961 | Nalley | 81/177.2 X |
| 3,869,934 | 3/1975 | Pierce | 74/242.12 |
| 4,437,648 | 3/1984 | Thorn et al. | 254/93 R |
| 5,396,820 | 3/1995 | Baker | 81/177.2 |

*Primary Examiner*—D. S. Meislin
*Attorney, Agent, or Firm*—Robert K. Rhea

[57] ABSTRACT

A mechanics flywheel belt tensioning tool kit is formed by a elongated strap metal handle extension removably connected at one end with a selected one of a series of strap metal dogleg-shaped wrench extensions. Each wrench extension is selectively provided on one of its flat surfaces with a rigidly connected laterally projecting standard socket wrench drive or wrench socket capable of entering with the handle extension, relatively narrow crowded spaces in vehicle engine compartments.

8 Claims, 2 Drawing Sheets

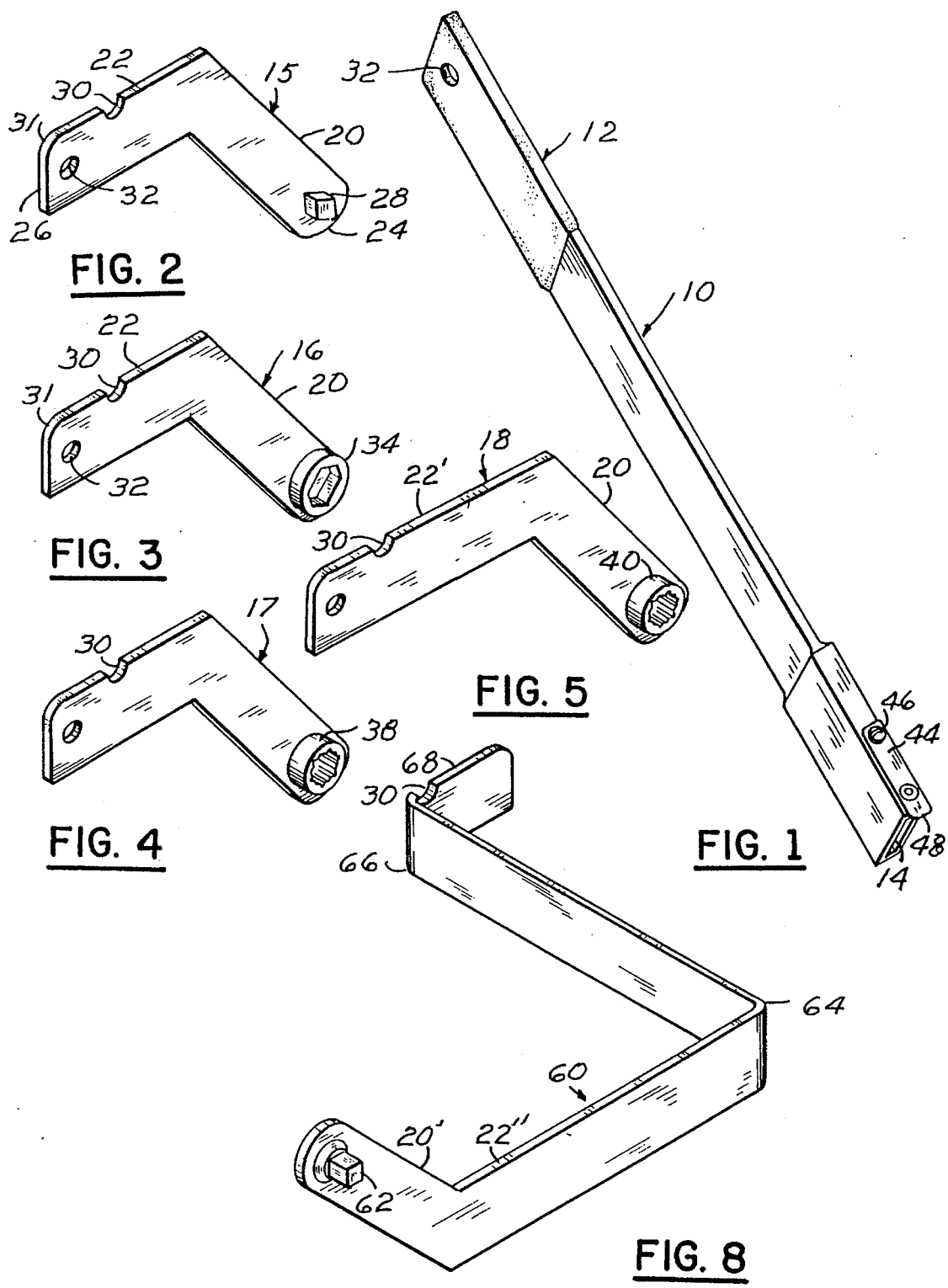

AUTOMOTIVE FLYWHEEL AND BELT TENSION TOOL KIT

BACKGROUND OF THE INVENTION

1. Field of the Invention

This invention relates to mechanics tools and more particularly to an automotive fly wheel removal and serpentine belt tension adjusting wrenches.

The task of tensioning the drive belt for an alternator or generator of vehicle engines has always been a problem in the industry. For many years, this task has been performed by the wedging of a tire iron, crowbar or piece of wood between the engine and the alternator or generator to move the latter against tension of the belt to tighten the latter to ensure angular rotation of the alternator or generator.

It has generally been difficult to move the generator or alternator to achieve the desired tensioning of the belt. It usually requires the use of both hands of the mechanic or operator to achieve the belt tension desired and to tighten the faster, such as bolts or nuts.

With the addition of other components to the engine assembly, such as a power steering unit and air conditioning compressors, some vehicle manufactures now use a belt extending around the several pulley's of the components to be driven by the engine drive pulley in serpentine fashion.

As a result of the new components under the engine hood the available area or space between the belt pulleys and other engine components is such that it is very difficult loosen the idler or belt tensioner pulley and move it in order to remove or replace the belt.

The several wrenches of this tool kit simplify the belt tensioning task.

2. Description of the Prior Art

U.S. Pat. No. 3,869,934 issued Mar. 11, 1975 to Pierce for BELT TENSIONING TOOL and U.S. Pat. No. 4,437,648 issued Mar. 20, 1995 to Thorn et al for BELT TENSIONING TOOL generally represent the state-of-the-art.

Both of these patents feature a pair of spreading members moved in an opposing directions between adjacent pulleys having a belt extending around the respective pulleys and do not address the problem of accessing the bolt or nut which holds the component to be loosened in order to achieve the belt tightening action which the tools of this kit accomplish.

SUMMARY OF THE INVENTION

This wrench kit comprises an elongated strap metal handle extension having a handle at one end portion and a rectangular socket at its other end portion for receiving one end portion of a series of dogleg-shaped strap metal wrench extensions respectively having a wrench drive or socket projecting laterally from its other end portion. A spring urged keeper or pawl projecting through the handle extension socket wall enters a recess in a respective dogleg end portion when inserted into the socket.

The principal object of this invention is to provide an elongated planar wrench handle extension having a handle at one end portion and means at its other end portion for removably receiving one end portion of a plurality of relatively narrow strap metal wrench drive or socket equipped dogleg-shaped wrench extension members for entering the area between closely spaced engine components incapable of receiving a conventional socket wrench or wrench extension and angularly rotating a screw thread equipped vehicle component.

Another object is to provide a series of wrenches capable of removing the flywheel in vehicles equipped with automotive transmissions.

BRIEF DESCRIPTION OF THE DRAWINGS

FIG. 1 is a perspective view of a wrench handle extension;

FIGS. 2, 3, 4 and 5 are perspective view of a series of dogleg-shaped wrench extensions respectively having an integral wrench drive, a six point socket and a twelve point socket projecting laterally from one of its respective end portions;

FIG. 8 is a perspective view of a modified dogleg-shaped wrench extension having an integral wrench drive projecting laterally from one of its end portions; and, FIG. 9 is fragmentary perspective view illustrating the wrench extension of FIG. 7 and the wrench handle extension of FIG. 1 in operative position.

DESCRIPTION OF THE PREFERRED EMBODIMENTS

Figure 6:
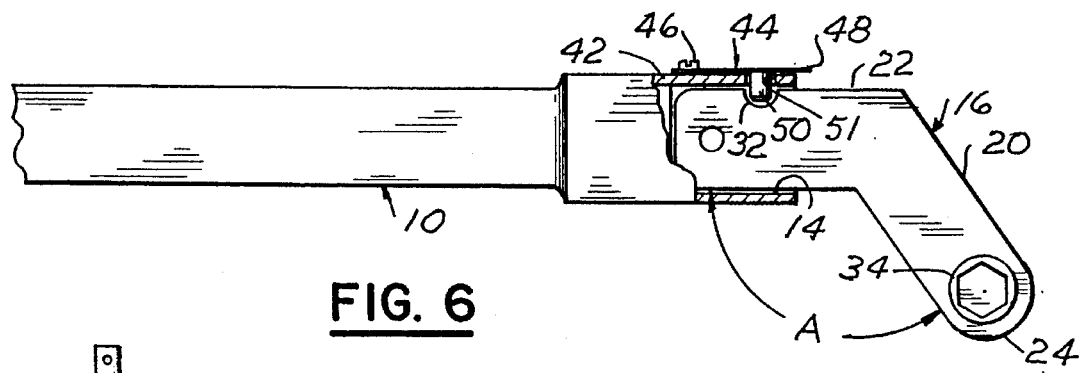
FIG. 6 is a fragmentary side elevational view, partially in section, of the wrench handle extension and the dogleg-shaped wrench of FIG. 2.

Like characters of reference designate like parts in those figures of the drawings in which they occur.

The reference numeral 10 indicates an elongated wrench handle of selected length formed from strap metal material having a handle 12 at one end portion and a longitudinally extending socket 14 at its other end for receiving wrench extensions, as presently explained.

The reference numerals 15, 16, 17 and 18 indicate a series of wrench extensions for use with the handle 10. The wrench extension 15–17 are substantially identical being dogleg-shaped in side elevation and similarly formed from strap metal material defined by a first end portion defining a wrench leg 20 and a second end portion defining a handle leg 22 lying in the same plane at an obtuse angle A, for example 110° to 125° (FIG. 6).

This angular (dogleg) shape of the several wrench extensions offsets the handle extension 10 with respect to the axis of the bolt or nut being angularly rotated and permits moving the handle extension through a greater arc.

The length of the legs 20 and 22 from their respective free ends 24 and 26 to the juncture with the other leg is substantially ¾ inches (14 centimeters). The edge of each of the handle legs 22 opposite the obtuse angle and intermediate its ends is provided with an arcuate recess 30 for the purposes presently explained. The handle edge surface containing the recess 30 is arcuately curved, as at 31, at its juncture with the free end surface 26 for the purposes presently explained.

Adjacent its end surface 26, the handle leg is provided with a transverse aperture 32 for hanging the respective wrench extension on a nail or peg, as desired.

The wrench extension 15, on one of its planar surfaces adjacent its free end 24, is provided with a laterally extending wrench drive of selected size, for example ⅜ or ½ inch as indicated at 28. Preferably two of the wrench extensions 15 are provided, one not shown, so that they may respectively be equipped with different size wrench drive.

The wrench extension 16 is rigidly provided, on one of flat surface of the wrench leg 20 with a six point wrench socket 36. The wrench leg porion 20 of the wrench extension 17 is similarly provided with a twelve point wrench socket 38.

The wrench extension 18 is substantially identical with the wrench extension 17 with the exception the handle end portion 22' is formed substantially twice the length of the wrench handles 22, for example 6½ inches (28 cm), for the purposes which will presently be explained. The wrench leg 20 of the wrench extension 18 is similarly provided with a twelve point wrench socket 40, for example 13 mm. Preferably two additional wrenches, not shown, substantially identical with the wrench extension 18 are formed and similarly provided with twelve point wrench sockets 15 and 18 mm, respectively.

One edge wall 42 defining the handle socket 14 is provided with a longitudinal extending overlying spring steel member 44 secured at one end portion as by a rivet 46 to the handle socket wall 42 and projects, at its other end 48, beyond the end of the handle defining the socket a selected distance.

A pawl 50 is secured to the spring steel member 44 and projects through an aperture 51 the wall 42 into the recess 32 of the respective wrench extension when its leg portion 22 is inserted into the socket. Insertion of the respective leg portion 22 into the socket 14 is facilitated by the radius 31 on the handle corner portion contacting the pawl for springing it upwardly against the resilience of the spring 44. The strap spring 44 normally biases the pawl into the recess to prevent separation of the wrench extension from the handle when in use.

Figure 7:
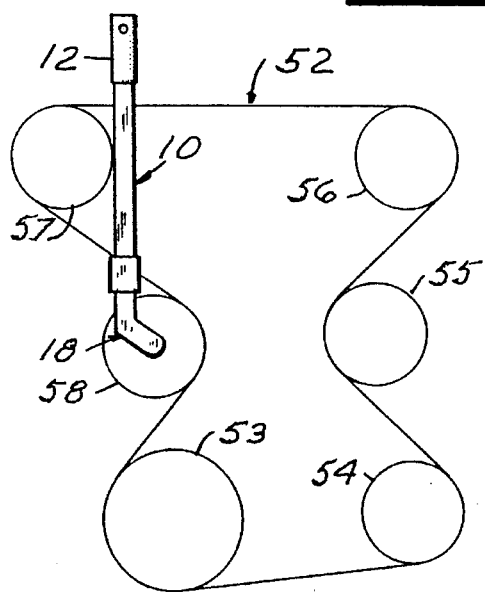
FIG. 7 is a mechanical diagram illustrating the assembled wrench of FIG. 5 in operative position.

Referring now to FIG. 7, a endless serpentine belt 52 is extended in series around a plurality of pulleys: a crank or drive shaft 53; an air conditioner 54; a water pump 55; an alternator 56; a power steering unit 57; and, a belt tensioner idler pulley 58. The tensioner pulley 58 conventionally maintains a desired tension on the belt 52. When the belt 52 must be removed or replaced, the handle 10 supporting the wrench extension 18 is positioned to engage the socket 40 with the bolt, not shown, axially supporting the pulley 58. The long extension handle 10 is manually moved and held by one hand of the mechanic in a direction against the spring tension of the tensioner to loosen the bolt, so that the mechanic may remove or install the serpentine belt with his other hand and thereafter, retighten the tensioner pulley bolt. The length of the wrench handle leg 22' disposes the handle extension socket wall radially beyond the periphery of the pulley 58.

On at least one brand of automotive vehicles commonly known, as vans, wrench operating space is very limited for access to the tension pulley of the serpentine belt extending around the several pulleys driven by the drive shaft pulley.

This problem is solved by the wrench extension 60 (FIG. 8) having a wrench leg 20' integrally connected with its handle leg 22", extending substantially twice the length of the wrench leg 22', of the wrench extension 18, where it is flatly turned laterally at 90° opposite the wrench drive 62 for a substantially identical distance and then again turned as at 66 in a direction opposite its wrench drive 62 and parallel with its wrench leg 22" terminating in a handle socket receiving end portion 68 similarly having a recess 30 for receiving the pawl 50 when inserted into the wrench handle socket 14.

Figure 9:
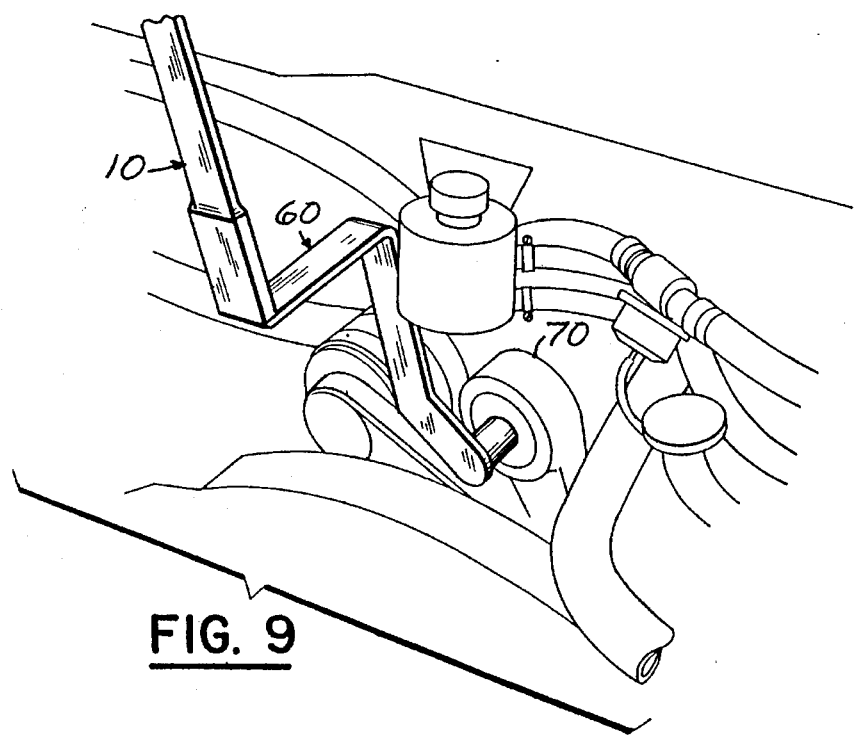

FIG. 9 illustrates the advantage of the handle off-set configuration of the wrench extension 60 connected with a fragment of the handle 10 and in operative positive for loosening and tightening a belt tensioner 70.

Obviously the invention is susceptible to changes or alterations without defeating its practicability. Therefore, I do not wish to be confined to the preferred embodiment shown in the drawings and described herein.

I claim:

1. An automotive flywheel and belt tension tool kit, comprising:

an elongated strap-like handle extension having a rectangular socket in one end portion;

a plurality of strap-like dogleg-shaped wrench extensions each having first and second end portions and having laterally projecting wrench means rigidly secured to said first end portion adjacent its terminal end for angularly rotating a screw threaded member, said second end portion adapted for entering the handle socket; and, pawl means on said handle extension for normally maintaining the respective wrench extension second end portion within the handle socket.

2. The tool kit according to claim 1 in which one edge surface of the second end portion of each wrench extension of said plurality of wrench extensions is provided with an arcuate recess for nesting said handle extension pawl means when the second end portion is inserted into the socket.

3. The tool kit according to claim 2 in which the wall forming the handle extension socket is provided with an aperture communicating with the socket and further including:

a pawl within the aperture for entering the respective wrench extension recess; and, a resilient member extending between and secured to said handle extension socket forming wall and the pawl for normally biasing the pawl into the aperture.

4. The tool kit according to claim 1 in which the wall forming the handle extension socket is provided with a pawl receiving aperture communicating with the socket and in which one edge surface of the second end portion of each wrench extension of said plurality of wrench extensions is provided with an arcuate recess cooperatively disposed adjacent the aperture when the second end portion is inserted into the handle extension socket, and further including:

a pawl within the aperture for entering the respective wrench extension recess; and, a resilient member extending between and secured to said handle extension socket forming wall and the pawl for normally biasing the pawl into the aperture.

5. The tool kit according to claim 4 in which the laterally projecting wrench means, comprises:

a socket wrench drive.

6. The tool kit according to claim 4 in which the laterally projecting wrench means, comprises:

a wrench socket.

7. The tool kit according to claim 3 in which the laterally projecting wrench means, comprises:

a socket wrench drive.

8. The tool kit according to claim 3 in which the laterally projecting wrench means, comprises:

a wrench socket.

\* \* \* \* \*